3,128,306
STABILIZATION OF ADIPIC ACID CRYSTAL SIZE BY STORAGE OF ADIPIC ACID FOR AT LEAST SEVEN DAYS

Nicholas D. Pintauro, New City, and Oscar R. Friedemann, Yonkers, N.Y., assignors to General Foods Corporation, White Plains, N.Y., a corporation of Delaware
No Drawing. Filed June 9, 1960, Ser. No. 34,887
2 Claims. (Cl. 260—537)

This invention relates to a method of preparing adipic acid. More specifically, it relates to a technique for obtaining adipic acid of desired particle size. As is apparent to those skilled-in-the-art, adipic acid has been known chemically for many years. However it commercial production only dates back to about 1935; prior to that time adipic acid was little more than a laboratory curiosity. Substantially the entire output of adipic acid from 1935 has been consumed in chemical processes, most commonly in the manufacture of nylon-type materials, but also in the manufacture of esters for use in plastics, etc. In such processes, the adipic acid which comes off the production line may be used directly in the ensuing chemical process or it may in due course be combined with other chemicals for further treatment. The chemical properties of adipic acid are primarily important, and the physical properties are not as important. Accordingly, little consideration has been given to the physical properties of adipic acid, i.e., handleability, crystal structure, particle size, changes during storage, etc. In fact, because of the almost complete absence of any substantial physical use of adipic acid in dry crystal form or in mixtures with other dry ingredients, very little has become known about the practical every-day physical properties of adipic acid which bear upon its handleability.

Although adipic acid may be made by several processes, e.g., the oxidation of benzene, in these processes the last step prior to shipping is commonly a crystallizing operation. Here the crude adipic acid crystals are dissolved in aqueous solution and after the solution is subjected to appropriate clarification, filtration, etc., the acid is crystallized. The crystallized adipic acid may then be separated from the mother liquor by well-known means and subsequently dried, for example, in a tunnel drier to give the adipic acid product of commerce.

If an ultimate use necessitates classification of the adipic acid to a given particle size or to a particle size distribution, this has generally been effected by classifying or screening immediately after the crystals are dried. This commonly occurs within a very short time after the crystals have been produced.

There are certain proposed uses of adipic acid wherein the adipic acid can be considered as a substitute for certain other acids which have heretofore been employed, e.g., citric acid. Typical of such uses is the use of adipic acid in gelatin desserts, q.v. U.S.P. 2,657,996 to Ferguson. In specifying the properties of the adipic acid and in particular the particle size distribution, it has been universally believed that it is desirable to set up the specification so that the adipic acid is specified to be of the same particle size as has heretofore been found necessary for the other acids, e.g., citric acid. Such a specification, for example, might call for a maximum of 30% through a 100-mesh screen and substantially 100% through a 40-mesh screen.

It has been commonly believed that this specification is readily enough complied with, and in ordering material from the manufacturer, he has been requested to follow this specification. The manufacturer accordingly has classified and screened freshly prepared adipic acid to meet this particle size specification. The so-classified, specially prepared adipic acid has then commonly been bagged and forwarded to the consumer.

Unexpectedly, it has been found that the adipic acid which had been previously classified to desired particle size, no longer meets the specification. More specifically it may be found that the particle size distribution is random and that the amount of fines has increased spectacularly. On one occasion, for example, the proportion of adipic acid passing through a 100-mesh screen had increased from about 17% to about 66%. On further study, it became apparent that all of the material which had met the specifications at the manufacturer's plant, was non-specification material at the point of use, despite the fact that the handling of the acid had been rather mild, and there was no a priori reason to believe that the change in particle size could have been effected as a result of abusive handling or inordinate changes in humidity, temperature, etc. A change of this magnitude may not have heretofore been thought to be objectionable for certain chemical uses; however, this change was so great that the resulting acid was considered unsatisfactory in view of the known standards which have heretofore been commonly accepted by those skilled-in-the-art of preparing physical formulations typified by dessert powders.

Although there may be physical-type uses for adipic acid wherein it may be possible to employ adipic acid of random particle size distribution, it is desirable under some conditions to control the particular particle size distribution.

It is an object of this invention to provide a technique for obtaining adipic acid particles of desired particle size. Other objects will be apparent to those skilled-in-the-art on inspection of the following description.

It has now been unexpectly found that freshly crystallized adipic acid may be characterized by a particulate or crystal instability. Although is is not possible to state precisely why this is so, it appears that when adipic acid crystals are freshly prepared, they are characterized by some internal strain, possibly of an electrostatic nature. Because of this, freshly prepared adipic acid crystals undergo a radical internal change even when stored under controlled equilibrium conditions at constant temperature, constant humidity, etc.; and as a result of this completely unexpected phenomena, the crystals disintegrate, shatter, deaggregate, deagglomerate, etc., and the average particle size decreases considerably in a matter of days. Under plant conditions wherein adipic acid may be stored in packages or upon containers, this crystal deterioration may occur more quickly.

In accordance with certain aspects of this invention, it is possible to prepare an adipic acid of predetermined particle size by the process which comprises crystallizing said adipic acid crystals, stabilizing said crystallized adipic acid crystals, and classifying said stabilized adipic acid crystals.

Crystallization of adipic acid may be effected by dissolution of the crude material in appropriate solvents, typically water, and then by heating with agitation until complete solution is effected. The adipic acid solution may then be clarified by passage through a bed of charcoal, or otherwise filtered to give a liquor which is substantially transparent and clear. Adipic acid crystals may be recovered from this liquor by evaporation of liquid therefrom under controlled conditions in a crystallizer. Typically this may include maintaining the mother liquor under controlled conditions of pressure, temperature, and time. Under the conditions prevailing within the evaporator, adipic acid crystals may be precipitated. It is preferred that the so-precipitated crystals be passed to an appropriate crystal reservoir from which they may be removed from the system. Preferably the so-formed crystals may be drained of mother liquor and dried.

It is preferred to pass the crystals through a tunnel dryer wherein warm forced air removes last traces of moisture from the crystal. The product adipic acid may contain very small amounts of water, typically approaching 0%; and the purity of the material may also approach 100% adipic acid.

In accordance with this invention, the adipic acid crystals which may be prepared as noted are stabilized. Preferably stabilization may be effected by storing the adipic acid crystals for at least about 7 days. The conditions of storage may be varied widely. Preferably however the temperature at which the crystals may be stabilized may be room temperature, typically 50° F.–90° F.; if desired, stabilizing during storage may be effected at lower temperature or even at higher temperature up to short of the melting point of adipic acid. Preferably the humidity of the air which contacts the adipic acid crystals during the storage-stabilization will be that prevalent in an ordinary well-run warehouse—commonly 30%–60% relative humidity, although stabilization may be effected outside of this range.

During the storage and stabilization, the adipic acid crystals will break down to form smaller crystals. For example, an adipic acid sample which when first prepared and before stabilization had a particle size distribution such that approximately 17% passed through a 100-mesh screen may, for example, be stabilized to give a product in which 60 to 70% will pass through a 100-mesh screen.

Typically, the adipic acid crystals may undergo little change during the first day or so after crystal formation. After about two days, the particle size distribution of the crystal mass begins to change; and during the period between about the second day up to about the seventh or tenth day, stabilization is effected. If it be tested on the eighth day and on subsequent days, it will be found that substantially no additional change in particle size distribution occurs. The period of stabilization will thus generally be considered as terminating on about the seventh day.

If it be desired to obtain adipic acid crystals of the predetermined particle size and typically if it be desired to obtain adipic acid having a uniform particle size, this can readily be effected by screening after the end of the stabilization period. If a mass of adipic acid be stabilized and screened about eight days after crystallization to give a particle size distribution such that 100% passes through 80-mesh and is retained on 100-mesh, then this material will retain that particle size distribution indefinitely when subjected to the normal conditions of temperature, humidity, etc.

*Example I*

In accordance with one specific embodiment of this invention, a freshly prepared commercial adipic acid, which had been permitted to stand for about not more than two days after being recovered from a crystallizer, was analyzed for particle size distribution. This unstabilized adipic acid was then permitted to stand in 50 pound bags at about 80 F. and above 60% relative humidity in a warehouse. After 10 days the particle size distribution of the stabilized adipic acid was measured. It was found that the stabilized and the unstabilized acids had particle size distributions as follows:

| Screen Mesh Size | Unstabilized, percent | Stabilized, percent |
|---|---|---|
| On 40 | 0.4 | 0.2 |
| 80 | 19.5 | 21.1 |
| 100 | 62.4 | 12.0 |
| 140 | 1.3 | 22.2 |
| 200 | 5.4 | 30.7 |
| In pan | 11. | 13.4 |
|  | 100.0 | 99.60 |

In the stabilized material, it will be noted that there is a much larger amount of fines, i.e., 66.3% through 100-mesh (as against 17.7% for the unstabilized); and further that the distribution is more even, i.e., the percentages of material on the various screens is about the same. It may be noted that a similar distribution of stabilized material is obtained if the unstabilized material were classified prior to stabilization so that, e.g., 100% passes through 40-mesh and is retained on 100-mesh.

One aliquot of the stabilized adipic acid was permitted to stand at the same temperature and humidity conditions for six months, and it was then tested once again to determine its particle size distribution. At the end of that period it was found that the particle size distribution had not changed significantly from that which it originally had after stabilization. A second aliquot of the adipic acid which had been stabilized for 8 days was screened to obtain therefrom a fraction which passed through 80-mesh and was retained on 100-mesh. This substantially homogeneous sample was stored for six months at 80° F. and above 60% relative humidity; and at the end of this period it was found that it had substantially the same particle size distribution as at the beginning of the six-month test.

It will thus be apparent the adipic acid which has been stabilized for a period of at least 2 days and commonly 7 to 10 days, and most preferably 8 days, has reached a crystal equilibrium situation such that the crystal structure remains the same on further storage.

The stabilized adipic acid of this invention particularly finds use in the preparation of gelatin desserts; other uses will be apparent to those skilled-in-the art.

Although this invention has been described with reference to certain specific embodiments, it will be apparent to those skilled-in-the art that various modifications and changes may be made thereto. This application is a continuation-in-part of application Serial No. 859,088, filed December 14, 1959, now Patent 3,067,036 and entitled Gelatin Dessert Composition.

What is claimed is:

1. A method of preparing stable adipic acid crystals which comprises storing adipic acid crystals for at least seven days to reduce said crystals to an average particle size wherein 60 to 66% of said crystals pass through a 100 mesh screen and the remainder are retained on a 100 mesh screen, said adipic acid crystals undergoing no further change in particle size, and classifying said stabilized adipic acid crystals according to particle size.

2. A method of preparing stable adipic acid crystals which comprises crystallizing adipic acid crystals from a mother liquor, storing a body of said crystals having a fines content wherein about 17% of the crystals pass through a 100 mesh screen for at least 7 days thereby reducing the average particle size of said crystals to a point wherein about 66% of said crystals pass through a 100 mesh screen, said adipic acid crystals undergoing no further change in particle size, and classifying said stabilized adipic acid crystals according to particle size.

References Cited in the file of this patent

Du Pont et al.: "Adipic Acid and Its Derivatives" (1957), pages 33 and 52.